(12) United States Patent
Nagatomo et al.

(10) Patent No.: US 7,970,282 B2
(45) Date of Patent: Jun. 28, 2011

(54) NETWORK REPEATER, REPEATER CONTROLLING METHOD AND PROGRAM PRODUCT

(75) Inventors: Shoichi Nagatomo, Fussa (JP); Nobuo Iizuka, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 608 days.

(21) Appl. No.: 12/130,019

(22) Filed: May 30, 2008

(65) Prior Publication Data

US 2008/0298812 A1 Dec. 4, 2008

(30) Foreign Application Priority Data

Jun. 1, 2007 (JP) ................................. 2007-146943

(51) Int. Cl.
*H04L 12/28* (2006.01)
*H04L 12/46* (2006.01)

(52) U.S. Cl. ................. 398/126; 398/6; 398/37; 398/62; 398/94; 398/173

(58) Field of Classification Search .......... 398/118–131, 398/96, 103, 6, 37, 62, 94, 126, 173
See application file for complete search history.

(56) References Cited

U.S. PATENT DOCUMENTS

| | | | | |
|---|---|---|---|---|
| 5,099,346 A * | 3/1992 | Lee et al. | ....................... | 398/118 |
| 5,493,692 A * | 2/1996 | Theimer et al. | ............... | 455/26.1 |
| 5,544,321 A * | 8/1996 | Theimer et al. | ............... | 709/226 |
| 5,555,376 A * | 9/1996 | Theimer et al. | ............... | 709/229 |
| 5,603,054 A * | 2/1997 | Theimer et al. | ................... | 710/6 |
| 5,611,050 A * | 3/1997 | Theimer et al. | ............... | 709/202 |
| 5,812,865 A * | 9/1998 | Theimer et al. | ............... | 709/228 |
| 5,982,520 A * | 11/1999 | Weiser et al. | ................ | 398/126 |
| 6,348,986 B1 * | 2/2002 | Doucet et al. | ................ | 398/128 |
| 6,414,774 B1 * | 7/2002 | Scifres | ......................... | 398/129 |
| 6,654,779 B1 * | 11/2003 | Tsuei | ............................ | 718/101 |
| 6,795,655 B1 * | 9/2004 | Sidorovich et al. | ........... | 398/128 |
| 7,167,510 B2 * | 1/2007 | Horst et al. | ..................... | 375/222 |
| 7,171,124 B2 * | 1/2007 | Smith et al. | ..................... | 398/97 |
| 2003/0170031 A1 * | 9/2003 | Kawabe et al. | ................ | 398/118 |

(Continued)

FOREIGN PATENT DOCUMENTS

JP 5-501494 T 3/1993

(Continued)

OTHER PUBLICATIONS

Japanese Office Action dated May 27, 2009 and English translation thereof, issued in counterpart Japanese Application No. 2007-146943.

*Primary Examiner* — Ken N Vanderpuye
*Assistant Examiner* — Tanya Ngo
(74) *Attorney, Agent, or Firm* — Holtz, Holtz, Goodman & Chick, PC

(57) ABSTRACT

A bridge controller, which controls relay between terminals including emission units and addresses assigned to the terminals, acquires coordinates of a light-received element in an light receiving unit at which light emitted from an emission unit is received, and stores the acquired coordinates in a location information table memory in association with a logical location on the network. Thereafter, it is determined whether or not the stored coordinates differ from newly acquired coordinates. When it is determined that the stored coordinates differ from the newly acquired coordinates, the logical location associated with the coordinates stored in the storage unit is controlled to be changed and stored.

4 Claims, 8 Drawing Sheets

U.S. PATENT DOCUMENTS

| | | | |
|---|---|---|---|
| 2003/0203734 A1* | 10/2003 | Igloi et al. | 455/431 |
| 2004/0021588 A1* | 2/2004 | Luby | 341/50 |
| 2004/0258415 A1* | 12/2004 | Boone et al. | 398/125 |
| 2005/0114507 A1* | 5/2005 | Tarui et al. | 709/224 |
| 2006/0045011 A1* | 3/2006 | Aghvami et al. | 370/230 |
| 2008/0028403 A1* | 1/2008 | Hoover et al. | 718/100 |
| 2008/0034273 A1* | 2/2008 | Luby | 714/776 |

FOREIGN PATENT DOCUMENTS

| | | |
|---|---|---|
| JP | 11-274990 A | 10/1999 |
| JP | 2001-244948 A | 9/2001 |
| JP | 2002-262180 A | 9/2002 |
| JP | 2005-151107 A | 6/2005 |
| JP | 2006-86868 A | 3/2006 |
| JP | 2006-262478 A | 9/2006 |

* cited by examiner

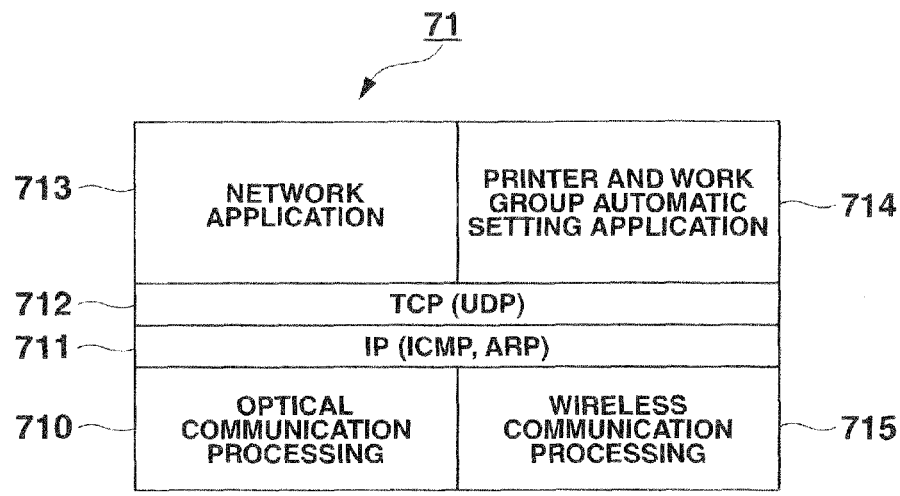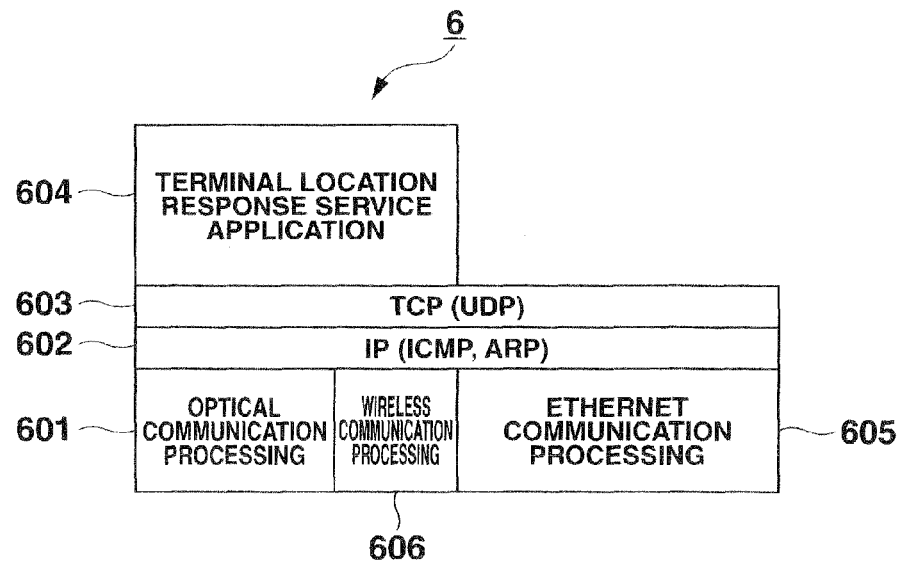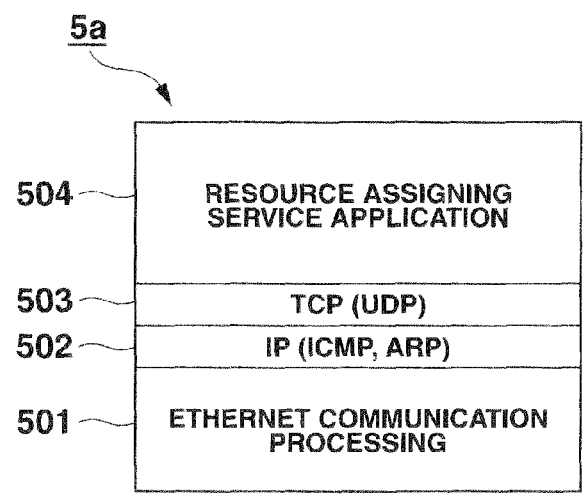

NETWORK REPEATER, REPEATER CONTROLLING METHOD AND PROGRAM PRODUCT

CROSS-REFERENCE TO RELATED APPLICATIONS

This application is based upon and claims the benefit of priority from prior Japanese Patent Application No. 2007-146943, filed Jun. 1, 2007, the entire contents of which are incorporated herein by reference.

BACKGROUND OF THE INVENTION

1. Field of the Invention

The present invention relates to a network repeater, a repeater controlling method and a program product for controlling between a physical location of a node present in a communication area of a communication system such as an optical local area network (LAN), which utilizes light as a communication medium, and address information on the network.

2. Description of the Related Art

Conventionally, a LAN system in which light is utilized as a communication medium has been proposed (hereinafter, such a system is referred to as an optical LAN). In the optical LAN system, a repeater is installed to a ceiling within doors, and network terminals such as a personal computer and a printer, which are also within the doors, are provided with communication devices. Between the repeater and the network terminals within a communication area, time division multiplex (TDM) communication is conducted. In order to untie a crossed line in information transmission due to conducting the TDM communication, a technique to flexibly assign network resources in accordance with physical locations of the network terminals is provided.

BRIEF SUMMARY OF THE INVENTION

An object of the present invention is to provide a network repeater, a repeater controlling method and a program product which can change flexibly a logical location on a network even when a physical position of a network terminal is changed.

According to an embodiment of the present invention, a network repeater which controls relay between a node including a light emitting device and a logical location assigned to the node on a network, the network repeater comprises:

a light detector including light receiving elements which are two-dimensionally arranged with regularity;

a coordinate acquiring unit configured to acquire coordinates of a light receiving element which detects light emitted from the light emitting device;

a storage unit configured to store the coordinates acquired by the coordinate acquiring unit in association with a logical location of the node on the network;

a first determination unit configured to determine whether or not the coordinates stored in the storage unit differ from coordinates newly acquired by the coordinate acquiring unit; and a storage controller configured to control the logical location associated with the coordinates stored in the storage unit to be changed and stored when the first determination unit determines that the coordinates stored in the storage unit differ from the coordinates newly acquired by the coordinate acquiring unit.

According to another embodiment of the present invention, a repeater controlling method for controlling a network repeater which controls relay between a node including a light emitting device and a logical location on a network assigned to the node, the network repeater including light receiving elements which are two-dimensionally arranged with regularity, the method comprises:

acquiring coordinates of a light receiving element which detects light emitted from the light emitting device;

storing the acquired coordinates in association with a logical location of the node on the network in storage;

determining whether or not the coordinates stored in the storage differ from newly acquired coordinates; and controlling the logical location associated with the coordinates stored in the storage unit to be changed and stored when it is determined that the coordinates stored in the storage differ from the newly acquired coordinates.

According to another embodiment of the present invention, a computer program product for use with a network repeater which controls relay between a node including a light emitting device and a logical location assigned to the node on a network, the network repeater including light receiving elements which are two-dimensionally arranged with regularity, the computer program product being stored in a computer usable medium including computer readable program means, the computer program product comprises:

first computer readable program means for acquiring coordinates of a light receiving element which detects light emitted from the light emitting device;

second computer readable program means for storing the acquired coordinates in association with a logical location of the node on the network in storage;

third computer readable program means for determining whether or not the coordinates stored in the storage differ from newly acquired coordinates; and forth computer readable program means for controlling the logical location associated with the coordinates stored in the storage unit to be changed and stored when it is determined that the coordinates stored in the storage differ from the newly acquired coordinates.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which:

FIG. 4A is a view showing an Ethernet protocol for a terminal;

FIG. 4B is a view showing an Ethernet protocol for the bridge controller;

FIG. 4C is a view showing an Ethernet protocol for a server;

DETAILED DESCRIPTION OF THE INVENTION

Figure 1:
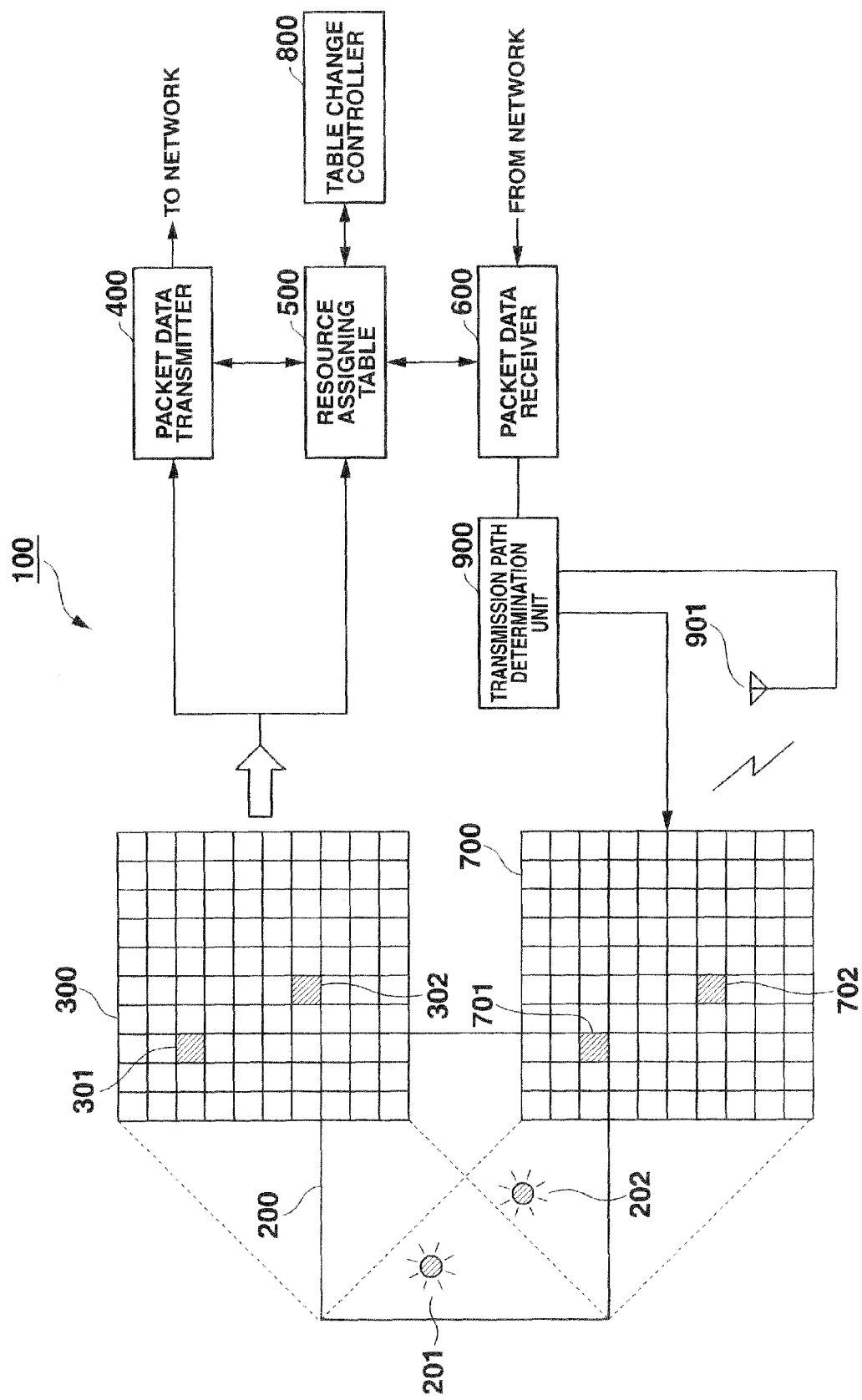
FIG. 1 is a view showing conceptually a configuration of a network repeater according to an embodiment of the invention.

Referring now to the drawings, an embodiment of the present invention will be described in detail as follows.

First of all, a conceptual configuration of the present embodiment will be described.

FIG. 1 is a view showing conceptually a configuration of a network repeater according to an embodiment of the invention.

A network repeater 100 includes a communication area 200, a two-dimensional light-sensitive element 300, a packet data transmitter 400, a resource assigning table 500, a packet data receiver 600, an information transmitter 700, a table change controller 800, a transmission path determination unit 900, and a transmission antenna 901.

As the communization area 200, an office within facilities (or indoors), in which an optical LAN system is laid, is assumed for instance.

The two-dimensional light-sensitive element 300 is mounted to a position from which the whole office can be seen, for example, on the ceiling of the office. The information transmitter 700 includes a plurality of LEDs which are arranged regularly.

The two-dimensional light-sensitive element 300 receives item of information 201, 202 or the like. Each of the items of information 201 and 202 (preferably, a luminance change pattern generated by a light-emitting device, such as an LED, blinking in accordance with predetermined pattern) is transmitted by luminance modulation from the light-emitting device contained in a node in the communication area 200.

Hatched areas 301 and 302 in the two-dimensional light-sensitive element 300 are elements which have received the items of information 201 and 202, respectively.

Hereinafter, the coordinates that represent the position of the light-received element 301 with respect to a surface of the two-dimensional light-sensitive element 300 are expressed as (X301, Y301), and the coordinates of the light-received element 302 are expressed as (X302, Y302).

The item of information 201 received at (X301, Y301) and the item of information 202 received at (X302, Y302) are output to the packet data transmitter 400 where the packet data is created to be output to a network, which is outside of the figure.

When the two-dimensional light-sensitive element 300 receives the items of information 201 and 202, physical location information of each of the items 201 and 202 is registered in the resource assigning table 500. Moreover, in the resource assigning table 500, the physical location information (information identified by the above coordinates (X301, Y301) and (X302, Y302)) is associated with logical location information which is set on the network.

In the case where a received item of information is an address (logical location information) that designates a node from which the item of information is transmitted, the address is registered in the resource assigning table 500 in association with the physical location information of the node.

Therefore, when the packet data transmitter 400 generates packet data from the information transmitted from the node to transmit the generated packet data to the network, the packet data transmitter 400 can acquire from the resource assigning table 500 the logical location information which corresponds to the physical location information of the node. The logical location information of the node can be set as a sender address in the packet data and transmitted to the network.

On the other hand, the packet data receiver 600 receives packet data output from the network and converts the packet data into information to be transmitted to a node in the communication area 200.

Upon receiving the packet data, the packet data receiver 600 refers to the resource assigning table 500 based on logical position information which is a destination address contained in the received packet data, and identifies corresponding physical location information. The packet data receiver 600 modulates information to be transmitted to the node (identified by the destination address), which is converted from the received packet data, into a luminance change pattern and outputs the luminance change pattern to the information transmitter 700 to blink an LED at a position corresponding to the identified physical location information.

For example, an LED 701 blinks in the case where the node is identified by coordinates (X301, Y301).

Furthermore, an LED 702 blinks in the case where the node is identified by coordinates (X302, Y302).

The table change controller 800 acquires light receiving condition of the two-dimensional light-sensitive element 300 at given time intervals, and compares the acquired receiving condition with registered contents in the resource assigning table 500. Then the table change controller 800 determines whether or not there is any change with respect to registered light-received element, that is, whether or not an element is detected at which an item of information is newly received. When there is any change, the table change controller 800 updates the resource assigning table 500.

The transmission path determination unit 900 determines on the basis of the updated resource assigning table 500 to transmit information by blinking an LED of the information transmitter 700 or to transmit the information in the form of a radio signal via an antenna 901.

That is, in the case where the registered contents in the resource assigning table 500 are not changed in a given time period, the transmission path determination unit 900 determines that the node is not moved, and blinks an LED closest to the node. When there is any change in the registered contents of the resource assigning table 500, the transmission path determination unit 900 determines that the node is moved, and transmits the information using a radio communication system, such as IEEE802 series.

Accordingly, even when the location of the node changes within the communication area 200, the information based on the packet data received from the network can be transmitted to the destination node without fail.

It should be noted that components of the network repeater 100, e.g., the communication area 200, two-dimensional light-sensitive element 300, packet data transmitter 400, resource assigning table 500, packet data receiver 600, information transmitter 700, table change controller 800, and transmission path determination unit 900, may be modified variously.

Figure 2A:
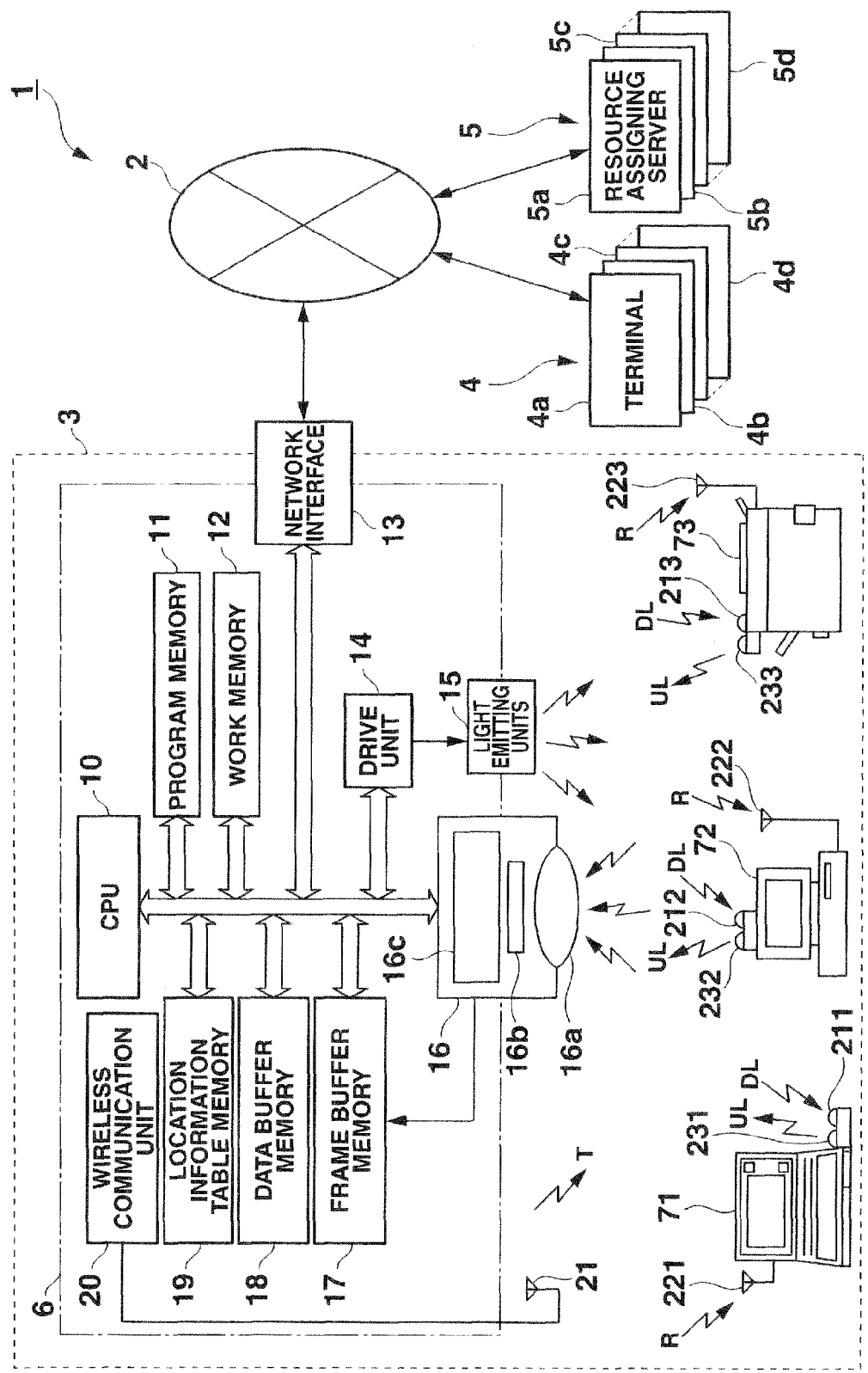
FIG. 2A is a view showing an entire network according to an embodiment of the invention.

FIG. 2A is a view showing an entire network system according to the present embodiment.

A network system 1 includes a network 2 and a communication area 3, and the network system 1 also includes a terminal group 4 and a server group 5 outside the communication area.

It should be noted that "outside the communication area" means the groups are positioned at the outside of the communication area 3.

The network 2 may be a wired communication medium based on Ethernet, ECHONET, IEEE1394, home phoneline networking alliance (HomePNA) or the like, or may be a wireless communication medium such as Bluetooth. The network 2 relays information transmission between the communication area 3 and the terminal group 4 or the server group 5 with the use of a general-purpose communication protocol (for example, transmission control protocol/internet protocol (TCP/IP)).

The terminal group 4 which is outside the communication area 3 includes terminals 4a to 4d, for example.

Each of the terminals 4a to 4d has identification information (address) which is unique at least in the network system 1, and is equipped with application programs required to use various services provided by the server group 5 or to use various resources within the communication area 3.

Furthermore, each of the terminals 4a to 4d is equipped with a network operation system (network OS) which supports the above-mentioned protocols.

The server group 5 includes a resource assigning server 5a and other servers 5b to 5d (for example, a mail server, a file server, etc.).

Each of the servers 5a to 5d also has identification information (address) which is unique at least in the network system 1, and is equipped with an application program for providing a server service and a network OS for supporting the above-mentioned protocols.

Next discussion will be made on the communication area 3.

The communication area 3 corresponds to the communication area 200 of FIG. 1 and includes a bridge controller 6 (equivalent to the above network repeater 100) attached to a position from which the whole office can be seen, for example, to the ceiling, and terminals 71, 72 and 73.

Optical receivers 211, 212 and 213 of terminals 71, 72 and 73 receive downlink light DL emitted downwards from the bridge controller 6. An light receiving unit 16 of the bridge controller 6 receives uplink light UL which is emitted from emission unit 231, 232 or 233 of terminal 71, 72 or 73.

In addition, the uplink light UL includes information which is to be transmitted to terminal 71, 72 or 73, or terminal 4a, 4b, 4c or 4d on the network 2, or server 5a, 5b, 5c or 5d on the network 2.

The bridge controller 6 includes:

a central processing unit (CPU) 10 which controls the whole of the bridge controller 6 in accordance with a predetermined control program;

a program memory 11 which stores the predetermined control program and the like;

a work memory 12 which functions as a main memory of the CPU 10;

a network interface (I/F) 13 which executes data transmission between the bridge controller 6 and the network 2 based on the general-purpose protocol (assumed to be "TCP/IP" for descriptive purpose, hereinafter);

a drive unit 14 which produces a drive signal corresponding to information transmitted from the CPU 10;

light emitting units 15 including LEDs which generate downlink light DL in accordance with the drive signal;

an light receiving unit 16 which captures a two-dimensional image of the communication area 3 and outputs an image signal;

a frame buffer memory 17 which stores the image signal output from the light receiving unit 16;

a data buffer memory 18 which stores information resulting from conversion of uplink light UL, which is emitted from emission unit 231, 232 or 233 of terminal 71, 72 or 73 and contained in the image signal output from the light receiving unit 16;

a location information table memory 19 (corresponding to the resource assigning table 500) which registers location information of the terminals 71, 72 and 73;

a wireless communication unit 20; and an antenna 21.

The light receiving unit 16 of the bridge controller 6 includes a lens 16a, an optical filter 16b and a two-dimensional image sensor 16c. The lens 16a spatially separates uplink light UL emitted from emission unit 231, 232 or 233. The optical filter 16b has transmission characteristics corresponding to a wavelength band of uplink light UL. The two-dimensional image sensor 16c converts an image of the communication area 3, which has passed the optical elements (lens 16a and optical filter 16b), into image signals and outputs the image signals at predetermined intervals.

For example, an interline transfer type charge coupled device (CCD) having N×M pixels (hereinafter "N=16, M=16" for descriptive purpose) is used in the two-dimensional image sensor 16c.

The wireless communication unit 20 is operated under the control of the CPU 10. Even when physical location corresponding to destination of received packet data, which is transmitted from the network 2, cannot be identified due to a change in the registered contents of the location information table memory 19, the wireless communication unit 20 has a function to receive information generated by converting the received packet data and to convert the generated information into information to be transmitted as a radio signal.

The antenna 21 radiates information converted by the wireless communication unit 20 as a radio wave.

In the communication area 3, contained are a portable terminal 71, a stationary terminal 72 such as a desktop computer and a terminal 73 such as a printer or a projector which outputs information requested via the network 2 by printing, projecting or displaying the information.

These terminals 71 to 73 respectively include emission units 231 to 233, optical receivers 211 to 213, and antennas 221 to 223. Emission unit 231, 232 or 233 modulates information to be transmitted into a luminance change pattern and emits uplink light UL according to the pattern. Optical receiver 211, 212 or 212 receives downlink light DL emitted from a light emitting unit 15 of the bridge controller 6 and converts information contained in the downlink light DL so that the information can be reproduced. Antenna 221, 222 or 223 receives a radio signal containing information which should be generated as downlink light DL under normal circumstances.

When information addressed to terminal 71, 72 or 73 is properly received, the terminal which has received the information supplies the received information to a certain application program prepared in advance and creates information to be transmitted by a certain application as needed.

Figure 2B:
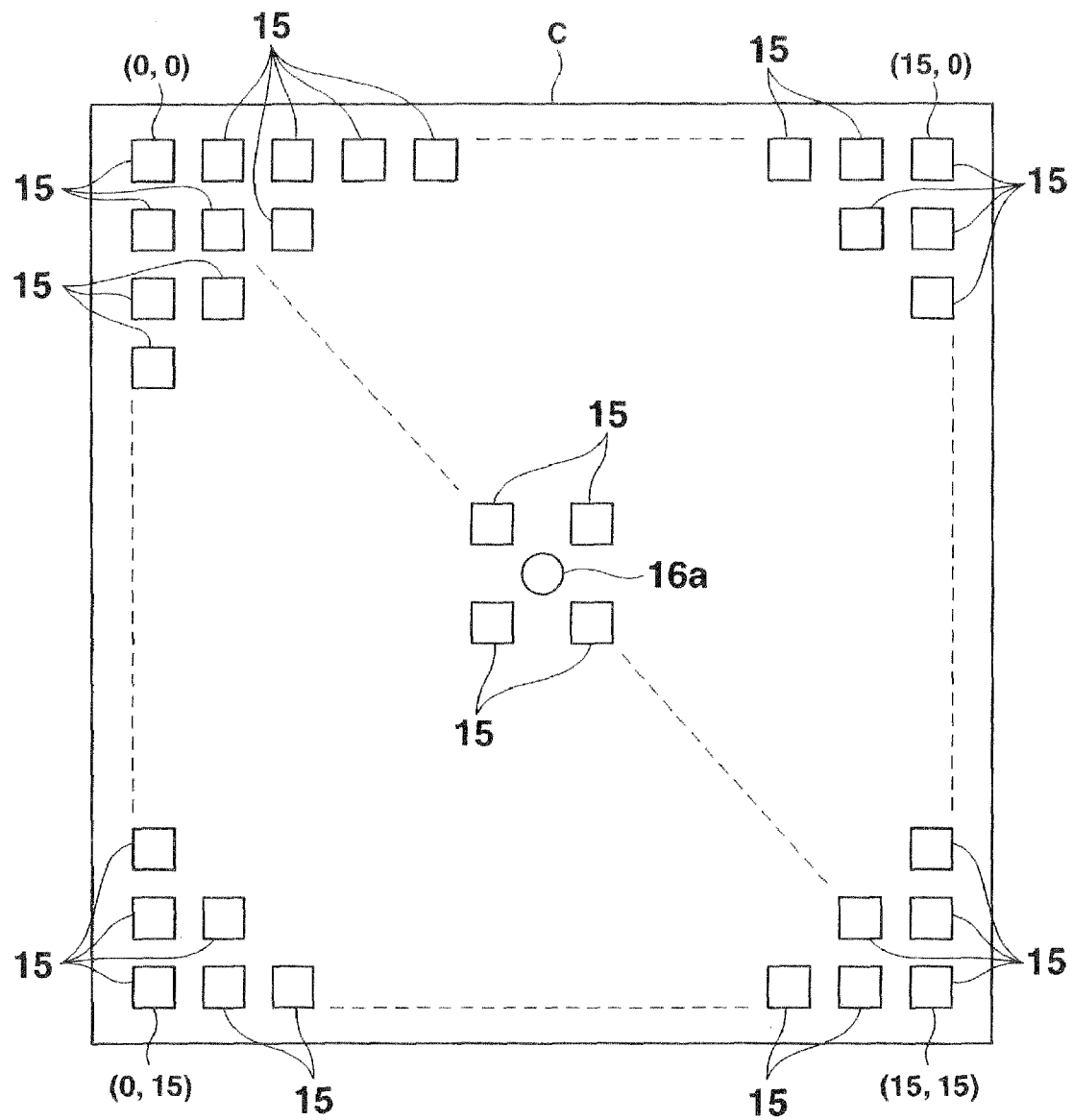
FIG. 2B is a view showing an aspect of a ceiling within doors.

FIG. 2B is a view showing an aspect of a ceiling within doors or a facility, according to the present embodiment.

In FIG. 2B, the lens 16a of the light receiving unit 16 is positioned at the center of the ceiling C. The light emitting units 15 are arranged with regularity around the lens 16a.

Arrangement of the light emitting units 15 is corresponding to arrangement of pixels on the two-dimensional image sensor 16c, and each of the light emitting units 15 emits light individually. Accordingly, terminal 71, 72 or 73 installed in the room can receive (receive light of) packet data transmitted with blink of a light emitting unit 15 which is right above the terminal.

Consequently, the terminals 71, 72 and 73 can receive packet data addressed thereto without wide-angle image capture elements.

It should be noted regarding FIG. 2B that a light emitting unit 15 itself may be a light emitting element (LED) which emits light, or a light emitting unit 15 may include individual light emitting elements and luminance of a part of the light emitting elements may be changed.

Next, the outline of an operation of the bridge controller 6 will be described.

The bridge controller 6 has two prominent functions of: (i) location information control function and (ii) information transmission function.

(i) Location Information Control Function

The location information control function is a function to control the correspondence between the physical locations and the logical locations of the terminals 71, 72 and 73.

The physical locations indicate positions of terminals 71, 72 and 73 in the communication area 3, and the logical locations indicate addresses of terminals 71, 72 and 73 set on the network.

Correspondence information between the physical locations and the logical locations of the terminals 71, 72 and 73 is registered in the location information table memory 19. The registered information is sequentially updated on the basis of an image signal obtained from the light receiving unit 16.

(ii) Information Transmission Function

Figure 3A:
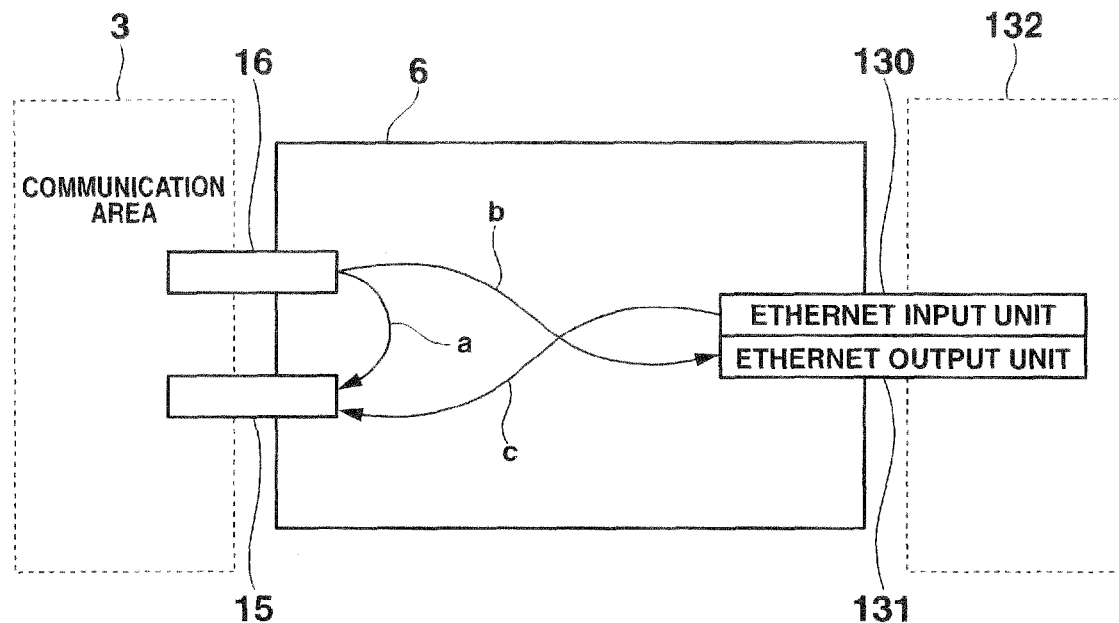
FIG. 3A is a view showing conceptually a function of a bridge controller.

The information transmission function is a function to relay information transmission performed between terminals which are inside or outside the communication area 3. This function is conceptually illustrated in FIG. 3A.

The bridge controller 6 includes paths "a," "b" and "c" between the light emitting units 15, the light receiving unit 16, and Ethernet input unit 131 and Ethernet output unit 132. The Ethernet input unit 131 and the Ethernet output unit 132 are provided in Ethernet interface (I/F) 13. Using these paths properly, the bridge controller 6 realizes a function of information transmission in the communication area and a function of information transmission into and out from the communication area.

For example, the path "a" is utilized for transmitting information between the terminals 71, 72 and 73 in the communication area 3.

The path "b" is utilized for transmitting information from terminal 71, 72 or 73 in the communication area 3 to the terminal group 4 or the server group 5 via the network 2.

The path "c" is used in the case of transmitting information via the network 2 from the terminal group 4 or the server group 5 to terminal 71, 72 or 73 in the communication area 3.

Figure 3B:
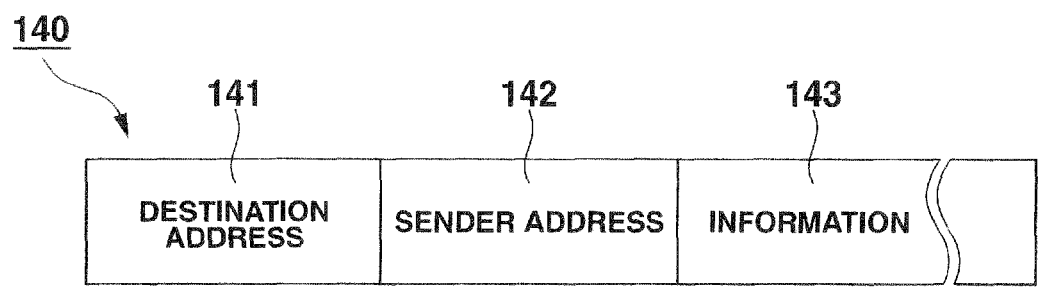
FIG. 3B is a view of a packet structure.

FIG. 3B is a view showing a structure of network packet data 140 which is transmitted as uplink light UL or downlink light DL. This structure corresponds to a packet structure of the data link layer of open system interconnection (OSI) reference model.

The packet data 140 includes a destination address frame 141, a sender address frame 142, and information frame 143. The destination address in the frame 141 and the sender address in the frame 142 may be media access control (MAC) addresses, for example.

FIGS. 4A to 4C show Ethernet protocols for the terminal 71, bridge controller 6, and resource assigning server 5a.

In FIG. 4A, the terminal 71 has optical communication processing 710 and wireless communication processing 715 which are set in a network interface layer (corresponding to the first and second layers of the OSI reference model), an internet protocol (IP) (internet control message protocol (ICMP), Address Resolution Protocol (APP)) 711 which is set in an inter-network layer (corresponding to the third layer of the OSI reference model), a transmission control protocol (TCP) (user data protocol (UDP)) 712 which is set in a transport layer (corresponding to the fourth layer of the OSI reference model), and a network application 713 and an automatic setting application 714 such as a work group which is set in an application layer (corresponding to the fifth to seventh layers of the OSI reference model).

The bridge controller 6 has optical communication processing 601, Ethernet communication processing 605 and wireless communication processing 606 which are set in a network interface layer, an internet protocol (IP) (ICMP, ARP) 602 which is set in an inter-network layer, a transmission control protocol (TCP) (UDP) 603 which is set in a transport layer, and a terminal location response application 604 which is set in an application layer.

The resource assigning server 5a has Ethernet communication processing 501 which is set in a network interface layer, an internet protocol (IP) (ICMP, ARP) 502 which is set in an inter-network layer, a transmission control protocol (TCP) (UDP) 503 which is set in a transport layer, and a resource assigning service application 504 which is set in an application layer.

Next, location information control in the bridge controller 6 will be described.

Figures 5A, 5B:
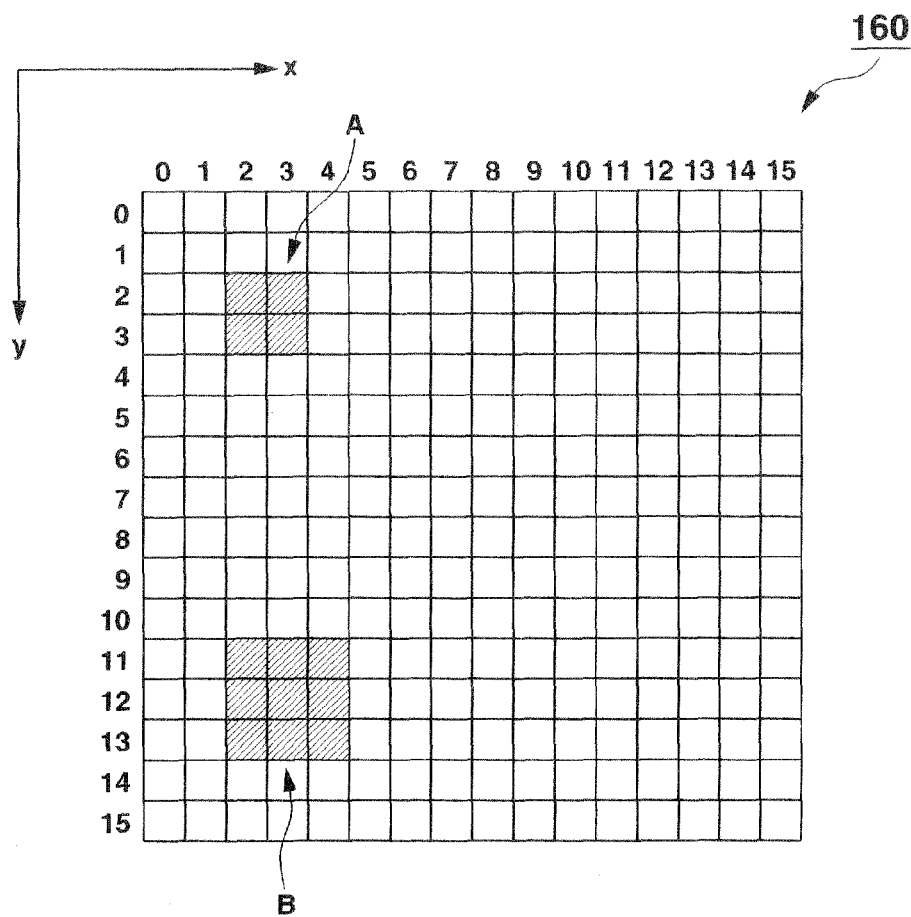
FIG. 5A is a view showing a concept of an image signal for describing a location information control function.
FIG. 5B is a view showing conceptually a location information table memory.

FIG. 5A is a conceptual view of image signal 160 output from the light receiving unit 16 of the bridge controller 6.

The image signal 160 includes 256 pixels from (0, 0) to (15, 15) as shown in FIG. 5A.

Areas A and B in the image signal 160 are areas where uplink light UL is received. The bridge controller 6 obtains coordinates of representative pixels of the areas A and B and registers the coordinates into the location information table memory 19.

FIG. 5B is a view showing conceptually the location information table memory 19 in which items of location information of the areas A and B are registered. In FIG. 5B, coordinates of two representative pixels (3, 12) and (2, 2) are registered.

In this way, items of physical location information (coordinates of representative pixels) of the areas A and B are registered in the location information table memory 19.

Furthermore, items of information set uniquely to the terminals 71, 72 and 73 (for example, MAC addresses or IP addresses) may also be registered in the location information table memory 19. The items of information can be obtained by capturing in time series the uplink light UL using the two-dimensional image sensor 16c and decoding luminance modulation of blinking pattern of the uplink light UL.

Next, an operation of a control program executed by the CPU 10 of the bridge controller 6 will be explained.

Figure 6:
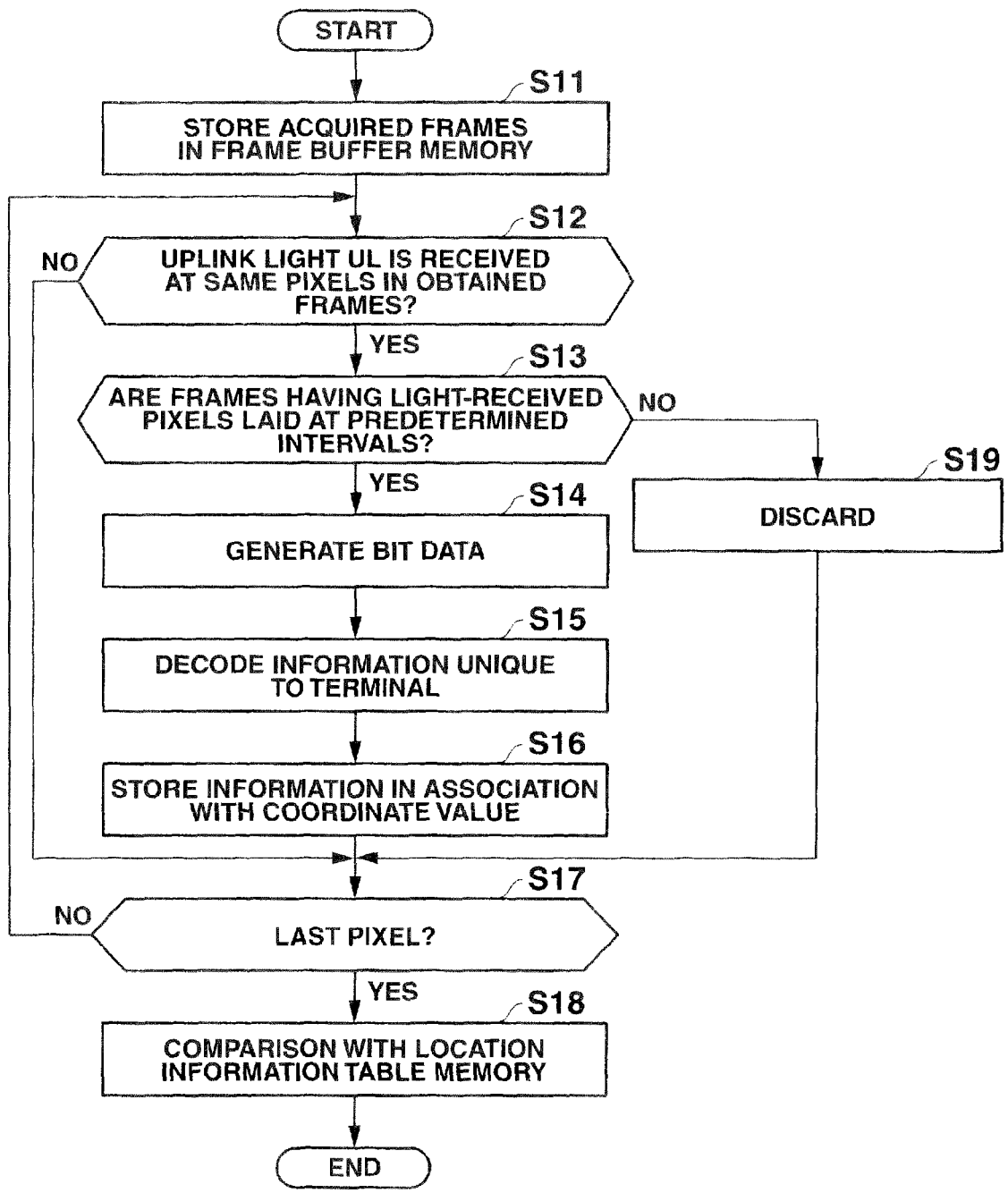
FIG. 6 is a flowchart of location information table memory registration/update processing.

FIG. 6 is a flowchart of location information table memory registration/updating processing performed by the CPU 10 of the bridge controller 6.

This processing is performed at preferred interval periodically (for example, at intervals of 30 minutes).

Firstly, frames of image signal 160 are acquired from the two-dimensional image sensor 16c for a predetermined time period, and the acquired frames are stored in the frame buffer memory 17 (step S11).

The CPU 10 determines, for every acquired frame, whether or not uplink light UL is received at a selected pixel (referred to as "target pixel") (step S12). If yes, it is determined whether or not the frames in which the uplink light UL is received at the target pixel are laid at predetermined intervals (step S13).

When it is determined that the frames are laid at predetermined intervals ("Yes" in step S13), it is considered that the target pixel obtains information subjected to luminance modulation and the CPU 10 generates bit data (step S14) in such a manner that "a light-received pixel" present sequentially throughout a plurality of frames is associated with "1" bit and a "non-light-received pixel" is associated with "0" bit, then the bits are arranged in order of the frames.

The generated bit data is decoded into information unique to a terminal which has emitted the uplink light UL (step S15). The information unique to the terminal is stored in the data buffer memory 18 and associated with coordinates of the target pixel (step S16). Then, it is determined whether or not the coordinates of the target pixel are (15, 15), i.e., whether or not the target pixel is the last pixel in the image signal 160 (step S17). When it is determined that the target pixel is the last pixel ("Yes" in step S17), the flow proceeds to a comparing process with the location information table memory 19 (step S18).

When it is determined that the frames in which the uplink light UL is received at the target pixel are not laid at predetermined intervals ("No" in step S13), it is determined that the target pixel does not receives any information but receives disturbance light, and the coordinates of the target pixel is discarded (step S19).

Then, it is determined whether or not the coordinates of the target pixel are (15, 15), i.e., whether or not the target pixel is the last pixel in the image signal 160 (step S17). When it is determined that the target pixel is the last pixel ("Yes" in step S17), then the flow proceeds to a comparing process with the location information table memory 19 (step S18).

Then, it is determined whether or not the coordinates of the current target pixel is (15, 15), i.e., the last pixel (step S17). When it is determined that the target pixel is the last pixel ("Yes" in step S17), then the flow proceeds to the comparing process with the location information table memory 19 (step S18).

On the other hand, when it is determined that the target pixel is not the last pixel ("No" in step S17), another pixel is selected as the target pixel and the processing of step S12 and thereafter will be repeated.

Details of processing in steps S12 to S17 are described in Jpn. Pat. Appln. KOKAI Publication No. 2002-262180; therefore, the description of the processing will be omitted.

In step S18, executed is processing to compare the coordinates and the information unique to the terminal stored in the data buffer memory 18 resulting from the processing in steps S12 to 17 with coordinates and information unique to the terminal stored in the location information table memory 19, and to update the coordinates and information collectively.

Specifically, the coordinates stored in the data buffer memory 18 are compared with the coordinates stored in the location information table memory 19.

When the same information unique to terminal 71, 72 or 73 is stored in both memories 18 and 19, it is determined that there is no location change due to a movement or the like of the terminal within the communication area 3 and updating is not executed regarding the coordinates of the terminal.

On the other hand, when it is determined that the information unique to terminal 71, 72 or 73 stored in the data buffer memory 18 differs from the information stored in the location information table memory 19, or when it is determined that coordinates disappear or newly appear in the data buffer memory 18, then it is considered that (I) terminal 71, 72 or 73, which has been inside the communication area 3 before updating, is moved from the communication area 3 (moved and no longer present in the communication area 3); or (II) a terminal is currently brought into a communication range of the communication area 3. Unique information corresponding to the coordinates which disappear or newly appear in the data buffer memory 18 is written in the location information table memory 19 as information unique to the coordinates.

In this manner, the location information table memory registration/updating processing is completed.

Next, outputting network packet data, which is transmitted from outside, to the communication area 3 will be described in detail.

Figure 7:
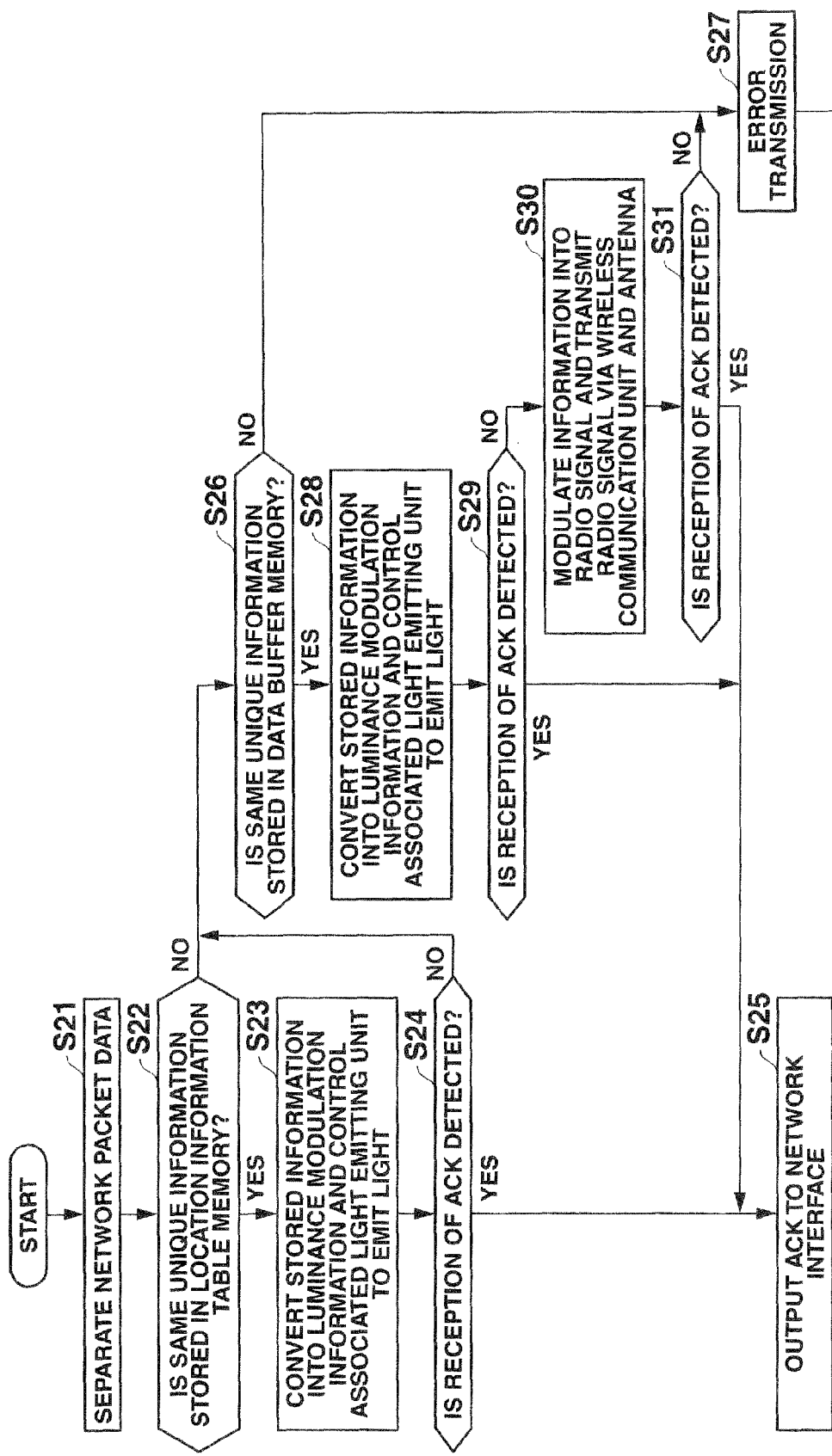
FIG. 7 is a flowchart of Ethernet port input processing.

FIG. 7 is a flowchart of Ethernet port input processing which is executed by the CPU 10.

When the flowchart is started, firstly the CPU 10 separates network packet data into destination address frame 141, sender address frame 142 and information frame 143 (step S21).

Then, viewing destination address in the destination address frame 141 as unique Information, it is determined whether or not the same unique information is stored in the location information table memory 19 (step S22).

When the same unique information is stored in the location information table memory 19, the CPU 10 converts the sender address stored in the frame 142 and the information stored in the information frame 143 into luminance modulation information, reads coordinates associated with the unique information, and controls, using the optical communication processing 601, a light emitting unit 15 corresponding to the read coordinates to emit light in accordance with the luminance modulation information (step S23). Note that the optical communication processing 601 is set in the network interface layer.

Then, it is determined whether or not acknowledgment (ACK) of reception of the light emission (or information transmission) is detected (step S24).

The determination of step S24 is made based on whether or not the acknowledgment information is received as luminance modulation information at a pixel having coordinates corresponding to the destination address.

When the acknowledgment (ACK) is received, the acknowledgement is output to the network interface (I/F) 13 (step S25) and the present processing is terminated.

In above step 24, it is determined whether or not the acknowledgment is received at the pixel of the coordinates corresponding to the destination address. However, it may be determined whether or not the acknowledgement information is detected anywhere in the two-dimensional image sensor 16c.

In the case where the whole region of the two-dimensional image sensor 16c is utilized for detecting acknowledgment information, the coordinates of the pixel at which the acknowledgment is received may be stored and associated with unique information in the location information table memory 19. Accordingly, the location information table memory 19 is updated.

As a result, the latest location of the terminal can be stored in the location information table memory 19.

On the other hand, when the reception of the acknowledgment (ACK) is not detected in step S24, or when it is determined in step S22 that the same unique information is not stored in the location information table memory 19, determination is made as to whether or not the same unique information is stored in the data buffer memory 18 (step S26).

The processing of step S26 allows identifying the terminal corresponding to the destination address based on the latest condition of the communication area which is to be stored in the data buffer memory 18 even when execution timing of the Ethernet port input processing is nearly the same as execution timing of the location information table memory registration/updating processing.

When it is determined in step S26 that the unique information is stored in the data buffer memory 18, the CPU 10 converts the sender address stored in the frame 142 and the information stored in the information frame 143 into luminance modulation information, reads the coordinates associated with the unique information stored in the data buffer memory 18, and controls, using the optical transmission processing 601, a light emitting unit 15 corresponding to the read coordinates to emit light in accordance with the luminance modulation information (step S28).

Consequently, even when terminal 71, 72 or 73 is moved within the communication area 3, a light emitting unit 15 corresponding to the moved destination can emit light.

When it is determined in step S26 that the unique information is not stored in the data buffer memory 18, the CPU 10 determines that there is no terminal corresponding to the destination address in the communication area 3, and transmits an error to the sender address (step S27).

After step S28, it is determined whether or not the acknowledgment (ACK) of reception of the information transmission of step S28 is detected (step S29).

When the acknowledgment (ACK) is received, the acknowledgement is output to the network interface (I/F) 13 (step S25) and the processing is terminated.

On the other hand, when the reception of the acknowledgment (ACK) is not detected in step S29, the sender address stored in the frame 142 and the information stored in the information frame 143 are modulated into a radio signal by the wireless communication processing 606 set in the network interface layer, and transmitted via the wireless communication unit 20 and the antenna 21 (step S30).

The processing of step S30 is a measure against the case in which, even though terminal 71, 72 or 73 is present in the communication area 3, optical communication is not available; for example, in the case in which there is a shield between a light emitting unit 15 and a light reception surface of optical receiver 211, 212 or 213, or in the case in which optical receiver 211, 212 or 213 is configured not to operate in terminal 71, 72 or 73.

Accordingly, information can be reliably transmitted to terminal 71, 72 or 73 in the communication area 3.

Then, it is determined whether or not acknowledgment (ACK) of reception of the information transmission in step S30 transmitted optically or by a radio wave is received (step S31).

When the acknowledgment (ACK) is received, the acknowledgment is output to the network I/F 13 and the processing is terminated (step S25).

On the other hand, when reception of the acknowledgement (ACK) is not detected in step S31, an error is transmitted to the sender address (step S27).

As described above, according to the bridge controller 6 of the present embodiment, a location of a terminal within communication area, which is under the control of the bridge controller 6, can be updated periodically. Thus, even when a terminal (light emitter) is moved, the bridge controller 6 can cope with the movement.

In addition, when optical communication is unavailable, communication can be made by other communication system, as long as it is known that a terminal is present in the communication area which is under the control of the bridge controller.

Consequently, even when a location of a terminal is changed, communication can be reliably executed.

In the present embodiment, the bridge controller installed within doors is explained. However, the invention is not limited to the embodiment. The present invention is applicable to a technique for relaying transmission between environment in which communication is performed using light as a communication medium and a network which is outside the environment.

What is claimed is:

1. A network relaying apparatus which controls relay to and from a node indicated by a light emitting device and a logical location assigned to the node on a network, the network relaying apparatus comprising:
   a light detector including light receiving elements which are two-dimensionally arranged with regularity;
   a coordinate acquiring unit configured to acquire coordinates of a light receiving element in the light detector which detects light emitted from the light emitting device;
   a storage unit configured to store the coordinates acquired by the coordinate acquiring unit in association with a logical location of the node on the network;
   a holding unit configured to acquire detection status of light by the light detector at a predetermined cycle and to temporarily hold the coordinates of the light receiving element which detects the light;
   a determination unit configured to determine whether or not the coordinates stored in the storage unit differ from the coordinates temporarily held by the holding unit;
   a storage controller configured to perform control so as to update the coordinates stored in the storage unit by the coordinates temporarily held by the holding unit and to change the logical location associated with the coordinates stored in the storage unit to the updated coordinates when the determination unit determines that the coordinates stored in the storage unit differ from the coordinates temporarily held by the holding unit;
   a receiver unit configured to receive data from the network;
   a logical location detector configured to detect from the data received by the receiver unit a logical location of a destination of the data;
   a first transmitter configured to transmit the data to the coordinates stored in the storage unit in association with the logical location when the logical location detector detects the logical location;
   a response detection determination unit configured to determine whether or not the light detector detects a response light in response to a transmission from the first transmitter; and
   a transmission control unit configured to control the first transmitter such that the first transmitter transmits the data based on contents held in the holding unit when the response detection determination unit determines that the light detector does not detect the response light during a control processing period of the storage controller.

2. The network relay apparatus according to claim 1, further comprising:
   an information generator configured to generate information assigned uniquely to the node from a temporal change in luminance of the light emitting device when the luminance of the light emitting device changes temporally,
   wherein the storage unit stores the information generated by the information generator in association with the logical location of the node on the network.

3. A non-transitory computer readable medium storing a computer program for causing a computer to function as elements comprising:

a coordinate acquiring unit configured to acquire coordinates of a light receiving element in a light detector including light receiving elements two-dimensionally arranged with regularity which detects light emitted from a light emitting device;

a storage unit configured to store the acquired coordinates in a storage in association with a logical location of a node on a network;

a holding unit configured to acquire detection status of light by the light detector at a predetermined cycle and to temporarily hold the coordinates of the light receiving element which detects the light;

a determination unit configured to determine whether or not the coordinates stored in the storage differ from the coordinates temporarily held by the holding unit;

a storage controller configured to perform control so as to update the coordinates stored in the storage by the coordinates temporarily held by the holding unit and to change the logical location associated with the coordinates stored in the storage to the updated coordinates when it is determined that the coordinates stored in the storage differ from the coordinates temporarily held by the holding unit;

a logical location detector configured to detect from data received from the network a logical location of a destination of the data;

a first transmitter configured to cause a transmitting device to transmit the data to the coordinates stored in the storage in association with the logical location when the logical location detector detects the logical location;

a response detection determination unit configured to determine whether or not the light detector detects a response light in response to a transmission from the first transmitter; and a second transmitter configured to cause the transmitting device to transmit the data based on contents held in the holding unit when the response detection determination unit determines that the light detector does not detect the response light during a control processing period of the storage controller.

4. The network relay apparatus according to claim 2, further comprising:

a second transmitter configured to wirelessly transmit the data to a destination indicated by the information generated by the information generator when the response detection determination unit determines that the light detector does not detect the response light after a control processing period of the storage controller.

* * * * *